United States Patent
Sinha et al.

(10) Patent No.: US 9,092,209 B2
(45) Date of Patent: Jul. 28, 2015

(54) WIRELESS CLOUD-BASED COMPUTING FOR RURAL AND DEVELOPING AREAS

(75) Inventors: Suyash Sinha, Kirkland, WA (US); Sreenivas Addagatla, Redmond, WA (US); Christian L. Belady, Mercer Island, WA (US); Charles Joseph Williams, Bothell, WA (US); Shaun L. Harris, Sammamish, WA (US); Eric C. Peterson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 623 days.

(21) Appl. No.: 13/162,603

(22) Filed: Jun. 17, 2011

(65) Prior Publication Data

US 2012/0324245 A1 Dec. 20, 2012

(51) Int. Cl.
*G06F 1/26* (2006.01)
*G06F 1/30* (2006.01)
*H05K 7/14* (2006.01)
*G06F 21/81* (2013.01)
*H04W 4/00* (2009.01)
*G06F 1/32* (2006.01)
*H04L 29/06* (2006.01)

(52) U.S. Cl.
CPC .. *G06F 1/30* (2013.01); *G06F 1/26* (2013.01); *G06F 21/81* (2013.01); *H04W 4/003* (2013.01); *H05K 7/1497* (2013.01); *G06F 1/3206* (2013.01); *H04L 63/102* (2013.01); *Y02B 60/50* (2013.01)

(58) Field of Classification Search
CPC ........... G06F 1/26; G06F 1/30; G06F 1/3206; G06F 21/81; Y02B 60/30; Y02B 60/50; H04W 4/003; H04L 63/102; H05K 7/1497
See application file for complete search history.

(56) References Cited

U.S. PATENT DOCUMENTS

| 7,724,513 | B2 * | 5/2010 | Coglitore et al. ........ 361/679.47 |
| 2006/0082263 | A1 * | 4/2006 | Rimler et al. ................. 312/201 |
| 2006/0274764 | A1 | 12/2006 | Mah et al. |
| 2007/0171888 | A1 | 7/2007 | Adams |
| 2008/0022136 | A1 * | 1/2008 | Mattsson et al. .............. 713/194 |
| 2008/0060372 | A1 * | 3/2008 | Hillis et al. .................. 62/259.2 |
| 2008/0278003 | A1 * | 11/2008 | Pouchet et al. ................. 307/66 |
| 2009/0050591 | A1 * | 2/2009 | Hart et al. ..................... 211/162 |

(Continued)

OTHER PUBLICATIONS

Reigadas, et al., "The Design of a Wireless Solar-Powered Router for Rural Environments Isolated from Health Facilities", Retrieved at << http://ieeexplore.ieee.org/stamp/stamp.jsp?tp= &arnumber=4547519&userType=inst/ >>, IEEE Wireless Communications, Jun. 2008.

(Continued)

*Primary Examiner* — Dennis M Butler
(74) *Attorney, Agent, or Firm* — Stein Dolan; Micky Minhas

(57) ABSTRACT

A framework that enables a local computing cloud infrastructure for rural (and third world) populations with the ability to connect into the global cloud. The framework include is a low cost architecture of long distance, wireless based, renewable energy powered, and small datacenter (DC) (referred to as a pico-DC) nodes that can fully operate off-grid, both power-wise and Internet connection-wise at a very low cost. Additionally, the framework includes power management and storage techniques that effectively enable low power and efficient power use. Thus, systems are self-sufficient, low maintenance and weather proof with no need for power or data connections.

33 Claims, 8 Drawing Sheets

(56) References Cited

U.S. PATENT DOCUMENTS

| | | | |
|---|---|---|---|
| 2009/0254763 A1 | 10/2009 | Belady et al. | |
| 2010/0139887 A1* | 6/2010 | Slessman | 165/67 |
| 2010/0165565 A1* | 7/2010 | Hellriegal et al. | 361/679.46 |
| 2011/0231280 A1* | 9/2011 | Farah | 705/26.8 |

OTHER PUBLICATIONS

Surana, et al., "Beyond Pilots: Keeping Rural Wireless Networks Alive", Retrieved at << http://www.icsi.berkeley.edu/pubs/networking/ruralwireless08.pdf >>, Proceedings of the 5th USENIX Symposium on Networked Systems Design and Implementation, 2008.

"Solar Energy in Telecommunications", Retrieved at << http://www.bechtel.com/assets/files/TechPapers/Solar%20Energy%20in%20Telecom.pdf >>, vol. 5 No. 1, Jan. 2007.

Raghunathan, et al., "Design Considerations for Solar Energy Harvesting Wireless Embedded Systems", Retrieved at << http://www.stanford.edu/class/cs240e/papers/kansal_spots05.pdf >>, Proceedings of the 4th international symposium on Information processing in sensor networks, 2005.

"A Low-Cost Efficient Wireless Architecture for Rural Network Connectivity", Retrieved at << http://cs.nyu.edu/~lakshmi/wire.pdf >>, Retrieved Date: Apr. 6, 2011.

"Cisco Aironet 1300 Series Outdoor Access Point/Bridge", Retrieved at << http://www.cisco.com/en/US/prod/collateral/wireless/ps5679/ps5861/product_data_sheet09186a00802252e1.pdf >>, Retrieved Date: Apr. 6, 2011.

* cited by examiner

WIRELESS CLOUD-BASED COMPUTING FOR RURAL AND DEVELOPING AREAS

BACKGROUND

The capabilities of cloud computing is largely limited to the developed countries where approximately one-sixth of the world's population lives. Thus, the majority of the world still lives in rural and non-urban areas of the developing countries, and has a low per capita income. Although telecom companies are creating large networks in developing countries, the networks are primarily voice-centric, with little or no interest to provide data services capabilities, due to the apparent lack of promising returns on investments.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is a framework that enables a local computing cloud infrastructure for rural and third world populations with the ability to connect into the global cloud (on the Internet). The framework includes a low cost architecture of long distance, wireless based, renewable energy powered, and small datacenter (DC) (referred to as a pico-DC) nodes that can fully operate off-grid, both power-wise and Internet connection-wise at a very low cost. Additionally, the framework includes power management and storage techniques that effectively enable operating at low power levels and efficient power use. Thus, nodes are self-sufficient, low maintenance and weather proof with no need for externally supplied physical power or data connections—the nodes use power from in-system sources and wireless data connections.

Each node is a standalone system that potentially includes power management to operate within constrained power requirements as provided by a renewable energy source, local wireless (e.g., Wi-Fi) connectivity for inter-node communications, long range connectivity to the Internet (or other global communication networks), a charge controller for charge management of the energy storage system (e.g., batteries), and so on. The computing resources and, optionally, content from the Internet, offered by the pico-DC node can be accessed by the community through local connections including but not limited to Wi-Fi, Bluetooth™, or serial interfaces such as universal serial bus (USB). In particular, access to the node services is possible through fixed stations or mobile terminals. The node provides scalability, primarily, in terms of a multiple server configuration that can adjust to the offered demand and available energy reservoir and, secondarily, in terms of multiple batteries, the number of which depends on the expected annual average solar illumination of the location where the node is installed. Once deployed and running, the nodes, through smart distributed software, can detect neighbor nodes, the node local environment, location, and optimize node behavior according to these variables.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
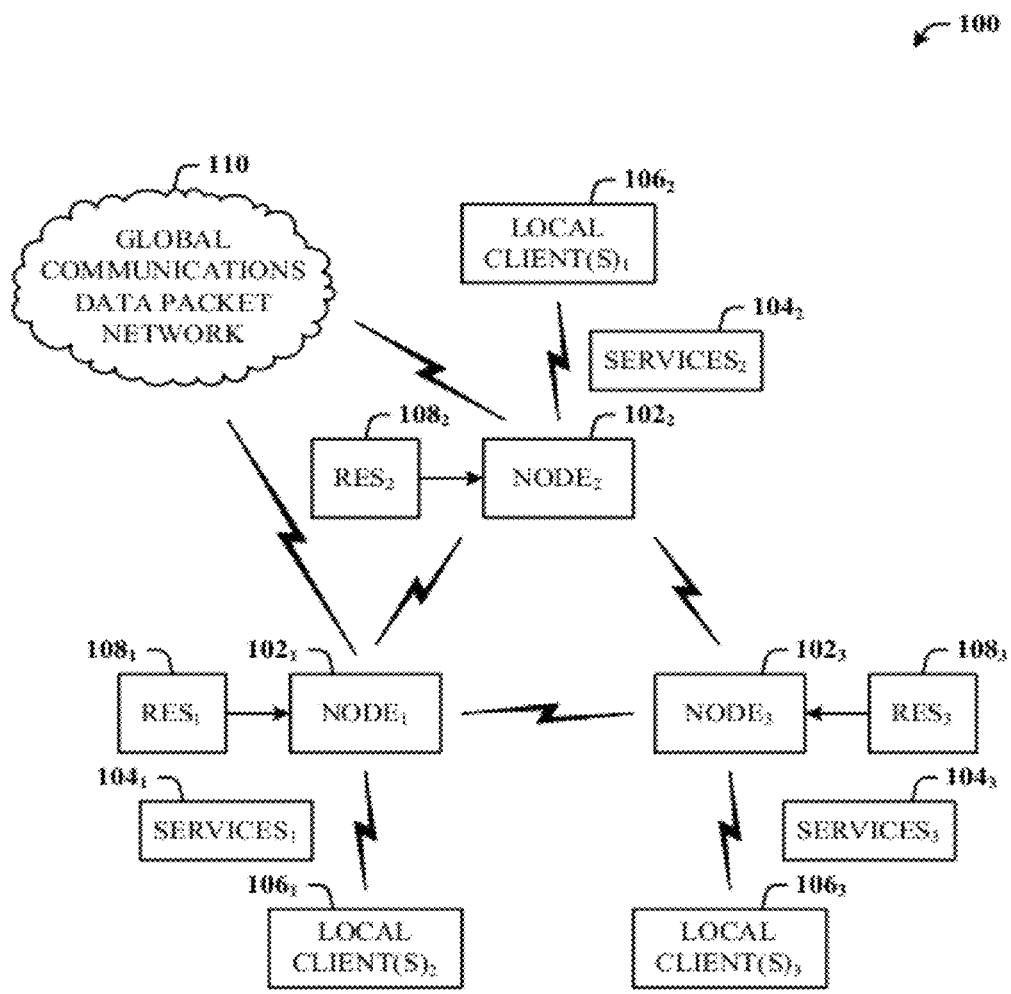
FIG. 1 illustrates a cloud computing fabric in accordance with the disclosed architecture.

An ever-increasing number of desktops, mobile devices, services and applications nowadays rely on the processing power and storage capabilities offered by datacenters to provide an enhanced experience to users. In the recent past, there have been only few proposals to harness the power of grid computing from mobile devices, all of which do not cover the concept of a "local cloud": computing services that are totally run locally by the pico-DC nodes and can fully operate autonomously in an off-grid fashion, both power-wise and Internet connection-wise.

The disclosed architecture is a cloud computing fabric for rural and developing countries where communication and service are severely limited or nonexistent. The fabric can include one or more datacenter (DC) nodes (referred to as pico-DCs) each of which provides stable, predictable, and reliable services to connected clients in the absence of stable and reliable power and Internet connectivity.

Each node is a portable, mountable, standalone unit designed for low-power consumption and wireless communications to the global cloud (e.g., the Internet, a datacenter on the Internet, etc.) at the edges. Each node is an optimized hardware design of the pico-DC. The dimensions and the weight of the node, along with a solar panel, are sufficiently small so that the node can be mounted on poles, existing antenna towers, and/or rooftops, for example.

A single board comprises both the networking (wireless and wired) transceivers and all the processors so that the inter-server communication, as well as the access to the storage is achieved over the highest possible throughput speeds with the minimal amount of power consumed.

The computational operations of the pico-DC node can be assisted on a voluntarily basis by local users such as schools, business offices and inactive kiosks that are willing to offer available processor cycles.

Power management is provided that dynamically powers off all node components when not in use, and prioritizes power between radio, processors, storage, etc., when power drops out or is reduced due to clouds or other causes for lack of sunlight. Power availability (e.g., solar, energy storage, etc.) can be modeled and estimated using weather prediction data. A control system adaptively shifts compute loads across as well as within the nodes according to both current and estimated power availability. An implementation the pico-DC can be housed in a weatherproof chassis with no physical power or data connection (e.g., NEMA4 and IP65 rated weather-proof chassis that houses all the electronic parts). A security system can be implemented that detects if the chassis is being moved, and thus, renders onboard hardware (e.g., hard drives) inoperable.

The pico-DC node finds particular implementation in small villages or rural areas of a few hundred people to be serviced. The services to be offered can be of a low bandwidth nature, targeted towards, but not limited to, information delivery (e.g., emergencies, weather, education, commerce, governmental services, etc.) and social networking. A node operates totally off the electricity grid, using solar or other available renewable energy sources (e.g., wind turbine generators, water generators, etc.). A pico-DC node can operate within a peak power budget as output by a small/medium sized solar panel (e.g., 150 watts). A node can also operate in open weather, subject to variances of temperature, humidity, and other conditions experienced across many regions of the world.

A node can be built and deployed within at a very low overall cost (e.g., less than $2,000 USD) and of nearly zero maintenance during the node lifetime. A node can connect to other nodes over distances ranging up to fifty kilometers. A network of nodes can employ one or more feeder points (e.g., gateways) to deliver content from the Internet and other desirable networks. In addition, low tech methods could be employed such as using mail carriers to plug-in physical media as a method for sharing and adding content. The computing resources and, optionally content from the Internet, offered by the pico-DC node can be accessed by the local client community through a local Wi-Fi connection, for example. In particular, access to node services is possible through fixed stations or mobile terminals. Additionally, based on power availability, the node may restrict the number of clients it supports based on set priorities with other functions such as communicating with other loads.

A network of pico-DC nodes enables an ever-increasing number of cloud-based applications and services that can significantly improve the standard of living for rural populations and create socioeconomic impact to the developing world. The usefulness of a local cloud, which can operate autonomously without being connected to the Internet, is better reflected through example scenarios, as follows.

Realtime images, thermal or otherwise, collected by the pico-DC nodes or other nodes nearby, can contain information relevant to emergency weather conditions or other public safety provisions. While useful, each separate image data is incomplete from a large-scale perspective. Extended provincial situational awareness and decision-making can be enabled if all these images are collectively processed with real-time, image processing algorithms.

In another example, a villager in a rural area, for example, of an under-developed or developing country who is not conversant with using gadgets such as smart phones wants to send a voice or text message relevant to a personal or business matter to another person in the same or different country. Simply by capturing his voice in his own local language dialect with a common use telephone or personal networked device, a machine learning-based, natural language processing program can translate, if necessary, the message to the intended recipient's dialect (e.g., Hindi), and then send it.

In yet another example, the connectivity and computational services provided by a pico-DC framework can help rural places where neither doctors nor tele-medicine and tele-diagnosis applications are available, to analyze a diverse set of symptoms and health condition parameters, and provide a potentially life-saving, first diagnosis. In addition to the personal level diagnosis, timely information pertinent to a looming epidemic may be gained and help save hundreds of lives in rural areas.

In a final example, a villager or local entrepreneur, in the fields of agriculture and livestock, for example, can offer to buy or offer for sale goods at the most beneficial price. A first stop can be to access the pico-DC enabled, local version of a web-type sale or auction service. Providing means to shop or barter goods and having access to a wider array of merchandisers or customers can enable growth opportunities in various market segments.

These example scenarios illustrate the importance of decisionmaking when relying on locally processed information before access, if any, becomes available to information resources of their developed world counterparts or the central government. It is to be understood that these are only but a few examples of ways in which the disclosed framework can be utilized.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a cloud computing fabric 100 in accordance with the disclosed architecture. The fabric 100 includes multiple interconnected portable datacenter nodes 102 (denoted $102_1$, $102_2$, $102_3$) that provide cloud computing services 104 (denoted $104_1$, $104_2$, $104_3$) to local clients 106 (denoted $106_1$, $106_2$, $106_3$). Each of the nodes 102 is powered solely by one or more locally renewable energy sources (RES) 108 (denoted $108_1$, $108_2$, $108_3$) and capable of operating independently of a global communications data packet network 110 while providing the cloud computing services continuously to the local clients 106. The local RES include, but are not limited to, local power generation via exercise bicycle configured to generate power, batteries that are rechargeable locally, and so on.

It is to be understood that any one or more of the nodes ($Node_1$, $Node_2$, and $Node_3$) can communicate with the network 110. It can also be the case that only the second node $102_2$ has the long range communications capability to communicate with the fabric 100 and, the first node $102_1$ and third node $102_3$ although operating, can only communicate using short range communications, in which case, the second node $102_2$ can function as a proxy for the first node $102_1$ and third node $102_3$ to access data and information systems on the network 110.

In general, it is to be appreciated that each node has the capability to operate independently without communications to an external network, to operate independently with communications to an external network, to operate in combination with other nodes as a group without communications to an external network, to operate in combination with other nodes as a group with communications to an external network, to operate through one or more nodes to communicate with an external network, and to act as a proxy for another node, for example.

Additionally, each node can operate to backup other nodes such that if one node goes down or is stolen, the data can be retrieved and installed on a replacement node. This can be implemented using known data synchronization techniques between nodes.

The nodes run coarse-grained power availability prediction algorithms based on weather forecast information. The node is capable of adapting its real-time power consumption based on the current environmental conditions, energy available in its charge tanks (e.g., the batteries), and the expected computational workload assigned or soon to be assigned. More specifically, the node can perform a compute load movement across the nodes of the cluster fabric, decrease excessive communications with peer nodes, cease all links to the public Internet (when using gateway nodes) and/or take a full snapshot of node state, store the state locally, and then transit to a deep sleep mode consuming a minimal amount to power (e.g., less than five watts).

The one or more locally renewable energy source(s) 108 include an energy storage system (e.g., lithium battery) charged by a solar panel system (or some other type of charging system). Each node 102 includes a power tracking component that monitors an input power curve of the one or more locally renewable energy source(s) 108 and provides optimum available power to a power supply unit and an energy storage array. Each node 102 includes a secondary power supply component that obtains power from an energy storage bank when power is unavailable directly from a solar power source (e.g., the one or more renewable energy source(s) 108). Each node 102 includes servers that run based on load requests and available power. The servers run a power prediction algorithm that predicts power available to run one or more of the servers. Each node 102 includes a router component that provides directional and broadcast connectivity to other nodes and community clients. Each node 102 includes an operation management component that controls computer load within a node and in cooperation with other nodes. Each node 102 includes a security component that disables functionality of a node in response to unauthorized movement of the node.

There may be times where there is excess power, in other words, the pico-DC is not using all of its available power at a given moment in time. Accordingly, each node can provide interface connections (e.g., USB) via which compatible devices can connect to charge energy subsystems, such as portable phones, portable computers, etc., and other clients that can access the power. This is especially useful in towns or remote locations that have little or no power availability. The management system can manage such power usage to only allow charging of these external devices when there is extra power available.

Figure 2:
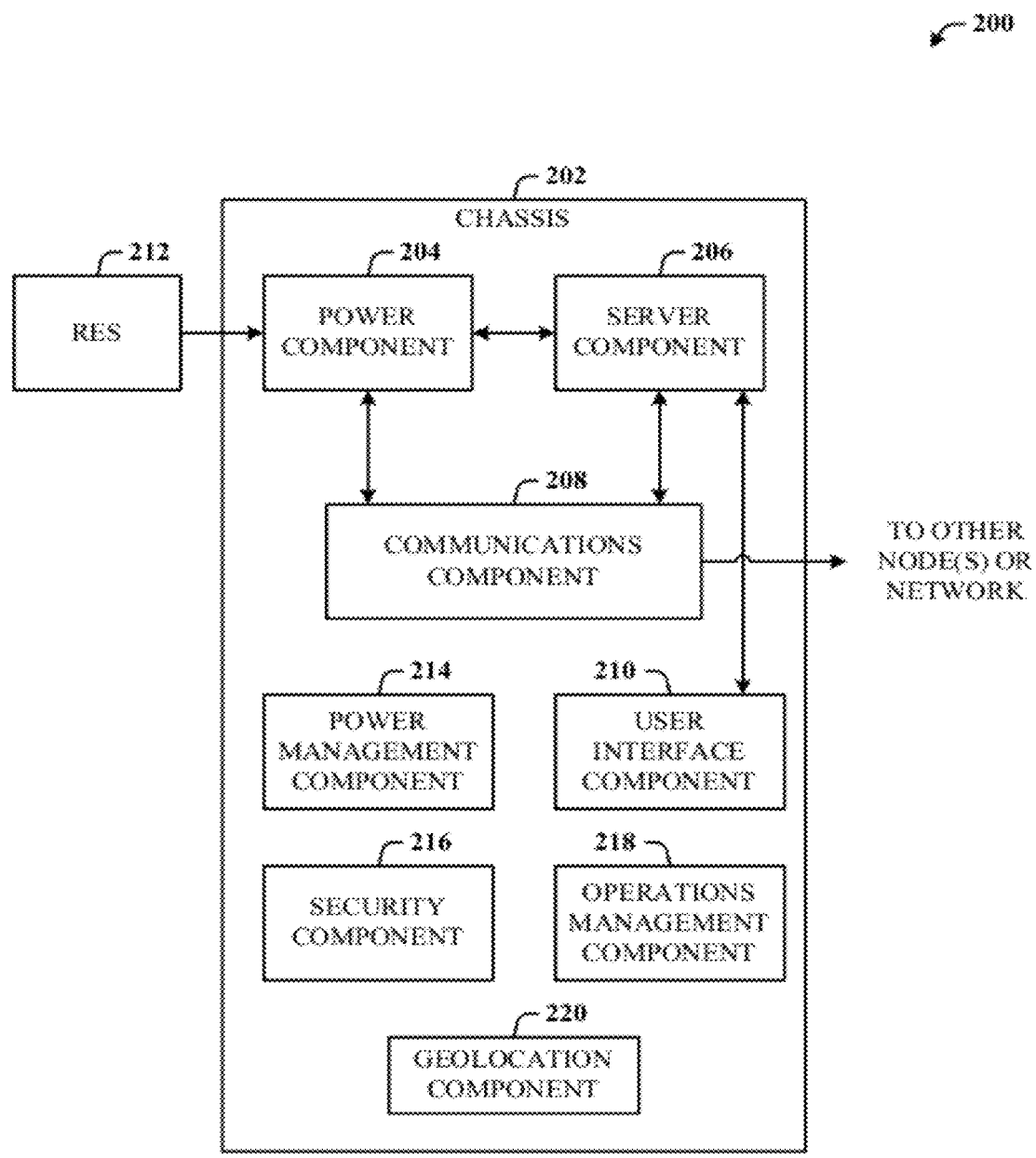
FIG. 2 illustrates an exemplary node in accordance with the disclosed architecture.

FIG. 2 illustrates an exemplary node 200 in accordance with the disclosed architecture. The node 200 includes a chassis 202 (e.g., weather proof) that houses components such as a power component 204, a server component 206, and a communications component 208, and a user input component 210. The power component 204 receives power from a renewable energy source (RES) 212, such as one or more solar panels.

A solar cell array (of the RES 212) can be utilized as the main power source for the pico-DC node, which charges a set of batteries. The batteries are utilized as a secondary power source if the RES 212 is not available (e.g., nighttime).

The power component 204 provides all onboard power for the components in the chassis 202. Thus, the power component 204 powers the server component 206 and the communications component 208. The server component 206 includes one or more server instances (and storage) according to the services offered.

The communications component 208 provides the transceiver subsystems for long range communications (e.g., node-to-node and node-to-network) and short range communications (e.g., node to local clients) to other nodes and/or networks. The communications component 208 can also include a router for connecting the server component 206 to the transceiver subsystems for long and short range communications.

A user interface component 210 interfaces to the server component 206 to enable a user to interact with the server instances and storage for setup and configuration, for example. The user interface component 210 can comprise basic devices such as a mouse, keyboard, USB interface, and display (video) components.

The node 200 can further include a power management component 214 that works in cooperation with the power component 204 to manage onboard systems to power onboard systems (e.g., server instances 306, router 316, connectivity 318, connectivity 320, etc.), off and on based on need. Power management functions can include disabling power to the system/component, and/or controlling the system/component to turn itself off. The power management capabilities can include more granular control to limit resource usage such as processor cores, memory modules, etc.

The node 200 can further include a security component 216 that disables functionality of the node 200 in response to unauthorized interaction with the node 200. For example, unauthorized interaction can include attempted access to the interior of the chassis by breaking an electrical bridge when separating a cover from the chassis. Another measure can be to automatically power down internal components of the node 200, such as server hard drives, CPU cores, memory modules, router, antenna systems, etc. Yet another measure can be to sense movement of the chassis relative to an existing position using sensors such a tilt meters, accelerometers, monitoring a change in GPS coordinates, etc. Login procedures can be imposed that if fails, automatically send notification to a user that may be responsible for the node 200. Notifications can be periodically (or on demand) sent in the form of logs and reports to the responsible user as well.

The node 200 can include an operations management component 218 that controls processing load across servers of the server system (the server component 206) within the node 200 and in coordination with servers of other nodes of the fabric. The operations management component 218 offloads processing to local clients and other external systems.

The node 200 can also include a geolocation component 220 (e.g., global positioning system (GPS)) that identifies geographical location of the node 200. A sufficient movement (e.g., feet, yards, etc.) of the node 200 as determined by a change in the geolocation coordinates can trigger a security shutdown as well.

The type of security mechanism employed can range from minor to extreme. For example, in one implementation, movement results in simply a power-down of the node and entry of a code to re-enable operation. A more moderate procedure can be implemented to result in disabling an encrypted hard drive and entry of the encryption key re-enables operation. An extreme procedure can be implemented that erases the encryption key to the hard drive, thereby disabling the node entirely.

Figure 3:
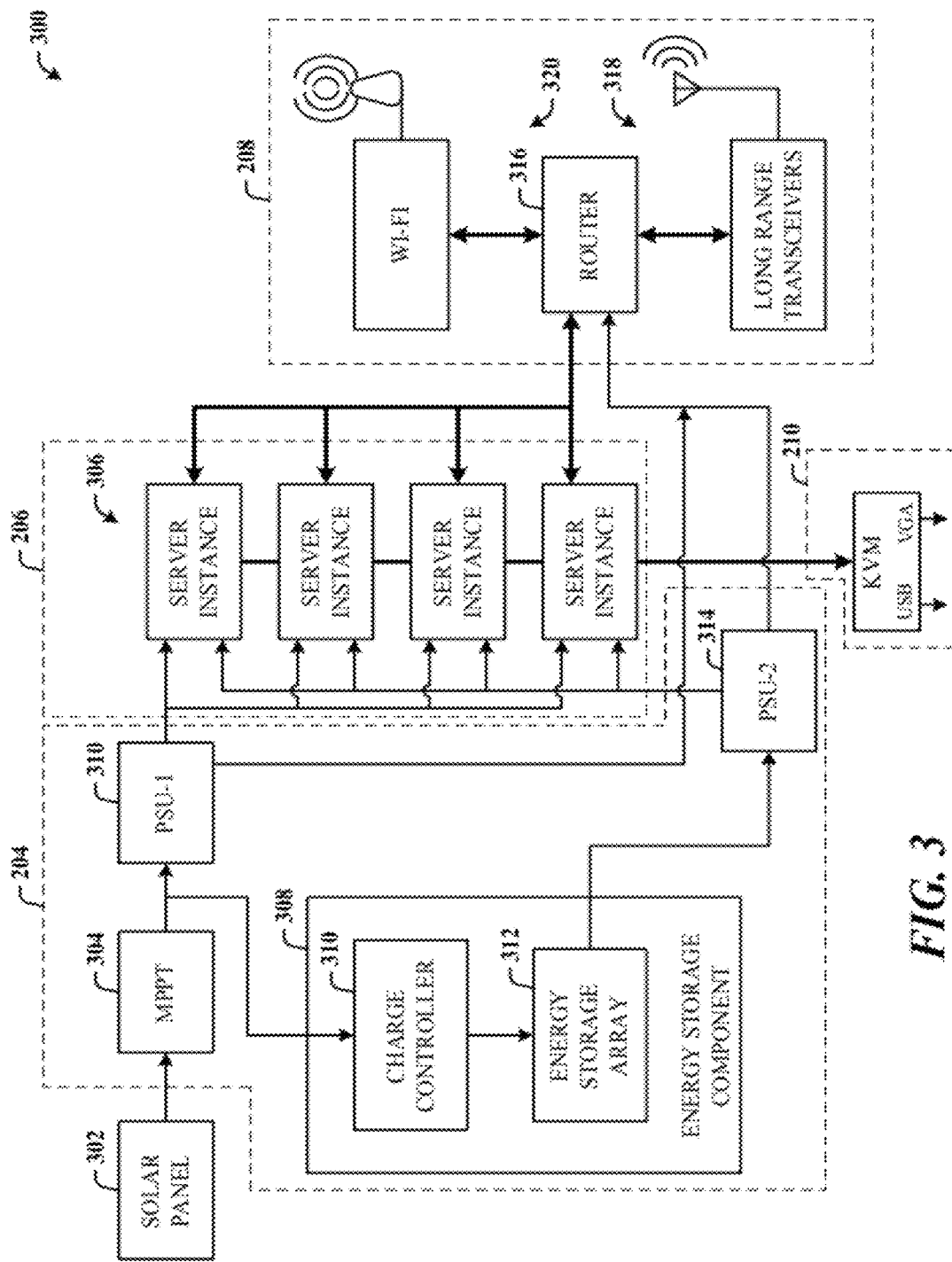
FIG. 3 illustrates a detailed diagram of an exemplary pico-DC node in accordance with the disclosed architecture.

FIG. 3 illustrates a detailed diagram of an exemplary pico-DC node 300 in accordance with the disclosed architecture. The node 300 comprises a solar panel 302 as a renewable energy source that supplies power to the power component 204. The power component 204 includes a maximum power point tracking (MPPT) device 304 which monitors the I-V (current-voltage) curve of the solar panel 302 and provides the maximum available variable power as an output. The MPPT output can be routed to a first power supply unit (denoted PSU-1) which directly powers the servers 306 of the server component 206 and the subcomponents (e.g., wireless subsystems, router, etc.) of the communications component 208, and powers an energy storage component 308 of the power component 204. A charge controller 310 monitors and controls the energy storage charge status of an energy storage array 312 to prevent over-charging and/or deep discharging of the energy storage array 312.

A second (secondary) power supply 314 (denoted PSU-2) interfaces to the energy storage array 312 to draw power from the energy storage array 312 to supply power only to the onboard systems (servers 306 and communications component 208) when the solar power from the solar panel 302 is not available (e.g., below a threshold for providing sufficient power).

The server component 206 is the compute unit which comprises one or more low power servers 306, the operation of which is dependent on the load request, as well as the power availability. The servers 306 can run an intelligent power control system that is based on a solar power prediction algorithm. This power shaping provides an invaluable tool for peak provisioning and smoothing power demand.

The server component 206 connects to a router 316 of the communications component 208, which router 316 provides long-distance (point-to-point, directional) Wi-Fi connectivity 318 to other nodes, and local (broadcast) Wi-Fi connectivity 320 to community client devices (e.g., net-books, smartphones or other Wi-Fi enabled mobile devices). The router 316 houses transceivers that connect to highly directional antennas and omnidirectional antennas, the long and short distance links, respectively (both of which can operate in multiple license-free frequency bands, e.g., 2.4 GHz and 5 GHz spectra).

The servers 306 can be locally configured and re-programmed, if necessary, through an optionally available keyboard-video-mouse (KVM) user interface component 210.

The design of the node provides scalability, primarily in terms of a multiple server configuration that can adjust to the offered demand and available energy reservoir and, secondarily in terms of multiple batteries, the number of which depends on the expected annual average solar illumination of the location where this node is installed. Once deployed and booted, the node, through smart distributed software, can detect neighbor nodes, local environment of the node, and location, and optimize node behavior according to these variables.

Put another way, a cloud computing fabric is disclosed that comprises a portable datacenter node that provides cloud computing services to local clients and operates independently of a global communications data packet network 110 while providing the cloud computing services continuously to the local clients. The node comprises an off-grid power system (e.g., the power component 204) that receives power from a solar-based power system (e.g., RES 212, the solar panel 302, etc.), a server system (e.g., the server component 206) that provides the services to the local clients (e.g., local clients $106_1$) on demand, a power management component that manages onboard systems to power onboard systems (e.g., server instances 306, router 316, connectivity 318, connectivity 320, etc.), off and on based on need, a router component (e.g., the router 316) that provides directional and broadcast connectivity with other nodes, the local clients, and optionally, the global communications data packet network 110, and a security component 216 that disables functionality of the node in response to unauthorized interaction with the node 200.

The node 200 can include an operations management component 218 that controls processing load across servers 306 of the server system (the server component 206) within the node 200 and in coordination with servers of other nodes of the fabric. The operations management component 218 manages the offload of processing to local clients and other external systems. The node 200 can also include a geolocation component 220 that identifies geographical location of the node 200. The node automatically detects other nodes and communicates with the other nodes of the fabric.

Figure 4:
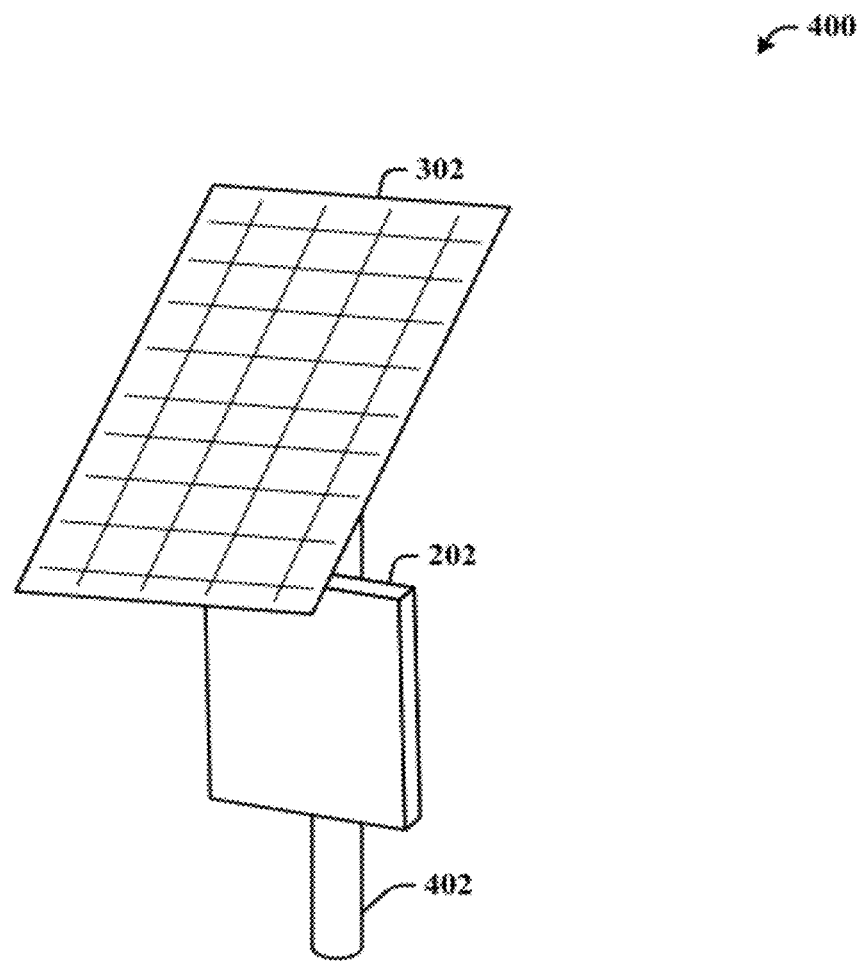
FIG. 4 illustrates an exemplary node implementation.

FIG. 4 illustrates an exemplary node implementation 400. Here, the chassis 202 is mounted on a pole 402. The solar panel 302 can also mount to the pole 402 and conduct power over a wire to the chassis 202 for all onboard systems and components, as described herein above. The implementation 400 is not limited to a single panel 302, but can incorporate multiple panels as well. Additionally, the chassis 202 can employ one or more heat sinks to maintain a stable operating temperature range by drawing heat away from the internal components and systems.

Figure 5:
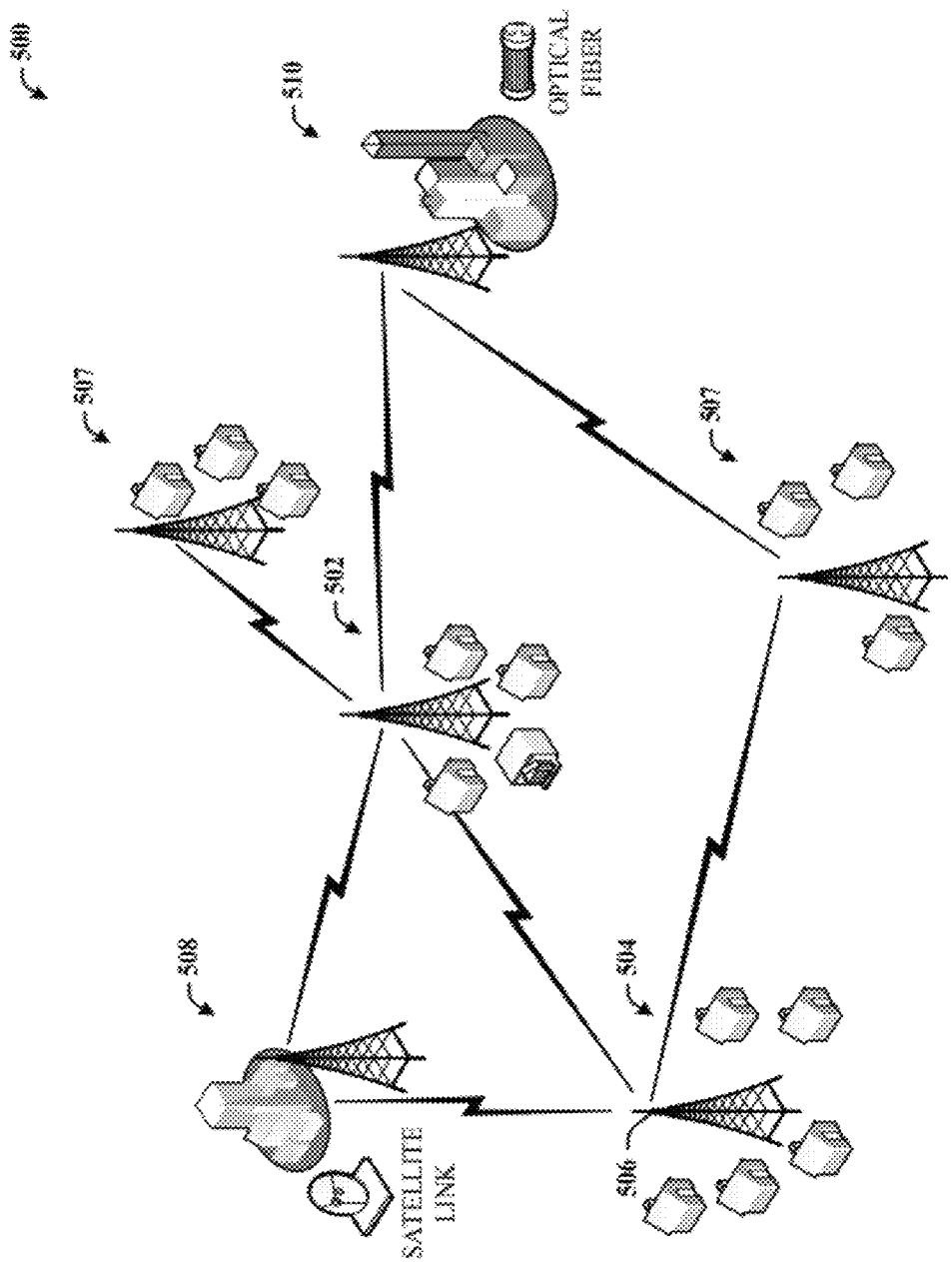
FIG. 5 illustrates a network of pico-DC nodes.

FIG. 5 illustrates a network 500 of pico-DC nodes. The fabric topology results from the combination of long-distance (e.g., 10-40 miles), point-to-point, high bandwidth (e.g., 5-30 Mbps) backhaul links, connecting villages and towns, and medium-range broadcast or point-to-multipoint access links to individual users and other public organizations or small businesses.

Conceptually, the same network comprises local cloud clusters (e.g., a first cluster 502 and a second cluster 504, and other local clusters 507) of a few hundreds of users, the head of which is a pico-DC node that also serves as a wireless mesh node. The cloud clusters are shown on the same topology and the pico-DC nodes are considered to be mounted on each of the towers (e.g., a first tower 506) of the clusters. In such networks there may or may not exist Internet gateways, as shown in a first city cluster 508 and a second city cluster 510.

The compute unit of the node contains a set of low power servers, the operation of which is dependent on the load request, as well as the power availability. The router module's process, which is described below and separate from the above set of processors destined for regular DC operation tasks, runs an intelligent power control system that is based on a solar power prediction algorithm. This power shaping is an invaluable tool for peak provisioning and smoothing power demand.

Additionally, from a mechanical design aspect, a low power processor configuration allows cooling to be completely fan-less, which enhances the node's lifetime and reliability. Specifically, the passive cooling of the circuit boards and processors is achieved by allowing air to flow either through large-area heat sinks of the water and air sealed enclosure, or through the waterproof air vents (bottom to top) of another enclosed placed tangentially right under the solar panel.

All the servers within a node can use the same storage device mounted as a file share, and this device is configured as a network attached storage. Solid state disks can be used due to increased reliability and low energy consumption.

For communications, the long range IEEE 802.11 Wi-Fi based networks can be employed to provide coverage to areas with sparse user populations. First of all, these networks are much more economically viable due to low cost. Additionally, Wi-Fi based networks are also the most representative example of decentralized evolution, where wireless networks are initially formed at villages and afterward expand toward large towns and cities; the so-called gateways. Second, Wi-Fi based networks are easy to deploy, since the corresponding hardware is small in size. Moreover, the communication can be carried on the Industrial, Scientific and Medicine (ISM) frequency bands that do not require licensing.

As previously described, the architecture provides power conservation techniques. Totally eliminating the router's idle power can be achieved by making the wireless board entirely shut down as if the power switch was to the OFF state and having the board powered on again only whenever the pico-DC node has to transmit or receive data from neighboring point-to-point nodes or local wireless clients. The decision on waking up the router board can be easily made locally by having its processor, which works as the "supervisor" of the pico-DC node, trigger the power switch of the board. However, in the case of receiving data this task is more challenging. The architecture can utilize a wake-on-WLAN technique according to which a 2.4 GHz wireless sensor mote is connected to the same directional antenna as the corresponding wireless card interface through a single-pole double-throw RF (radio frequency) switch. The mote's transceiver can be used to sense the same wireless link for "Wake-Up Req" probe packets emitted by its point-to-point neighbor, who wishes to establish a connection. In this latter case, the mote makes use of one of its own digital output pins to trigger the router's power switch.

The dependence of the operation of the pico-DC on the intermittent solar power means that power outages throughout a single day are possible as a result of sporadic local clouds or leaves covering just some of the solar cells but rending that corresponding whole line of cells useless.

Accordingly, each node includes a smart energy saving mechanism incorporated into the node's software architecture and that occupies a fraction of the computing resources of the router module's processor. The proactive part of these mechanisms involves running coarse-grained power availability prediction algorithms based on weather forecast information. On the reactive side, the node is capable of adapting its real-time power consumption based on the current environmental conditions, energy available in the batteries, and the expected computational workload assigned or soon to be assigned. Specifically, the pico-DC node can perform a compute load movement across the network, decrease excessive communication with peer nodes, cease all links to the public Internet (in case of gateway nodes) and/or take a full snapshot of its state, store it locally and transit to a deep sleep mode.

The real power that the node possesses cannot be unleashed unless each pico-DC node plays optimally the dual role of data originator and data router, and an efficient software parallel processing platform is used.

The two most prominent characteristics of the communications between the pico-DC nodes are that of multi-hop and multi-path. First, this type of communication allows path loss effects and shadowing to be effectively overcome, thus providing coverage over large geographical regions. At the same time, the energy efficiency of communication is improved given that, due to the attenuation constant, less power is consumed over multiple hops compared to the traditional single hop communication, if the latter is feasible. Node outage tolerance, due to either power outage or hardware failure, and ability to sustain sensor network functionalities is also provided because of the multiple paths available for the data to flow toward the same destination node.

Wireless mesh routing protocols that can be deployed for establishing the aforementioned data communication between pico-DC nodes are classified into two major categories, namely proactive and reactive. The protocol of choice for the proactive category can be an optimized link state routing protocol with link quality sensing. All routes from each node to any other node are computed beforehand even if some are never used. In other words, each pico-DC node builds a big routing table that incorporates global knowledge of the network topology. This approach facilitates a minimum delay for the calculation of the route to any node as a destination.

However, in order to maintain accurate and up to date information, routing information is distributed throughout the network. Thus, a reactive (or on demand) protocol category can be deployed. In this case, the wireless routers of the pico-DC nodes only construct the routing table when a packet is to be sent to a destination; in other words, only when needed. The choice of deploying a proactive or reactive routing protocol is dependent on the temporal dynamics of the traffic load over the network.

The increased efficiency of a software parallel processing platform can be achieved by not only tailoring this platform to the underlying hardware, so that efficient use of the available multiple processors is made but also by benefiting from the contribution of the local clients of the pico-DC nodes. There are a number of content caching and delivery solutions that enable access to Internet resources in a cached manner. This provides a primary vehicle of delivery for key information services envisaged for the disclosed pico-DC node environments.

In addition, web-based applications such as micro-transactions can be custom implemented over existing web service platforms.

The computational operations of the pico-DC can be assisted on a voluntarily basis by local users, such as schools, business offices and inactive kiosks that are willing to offer idle CPU cycles, as long as no technical knowledge is required for the setup of the client software. This collaborative approach not only provides a more complete and longer sustained operation of the pico-DC framework, but also can add large amounts of computing resources depending on the user density.

The disclosed architecture can promote the notion of a distributed virtual Infrastructure-as-a-Service (IaaS), where a user shares his own CPU cycles when not needed and asks for peer help when in need to process a computationally heavy job at another time point.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
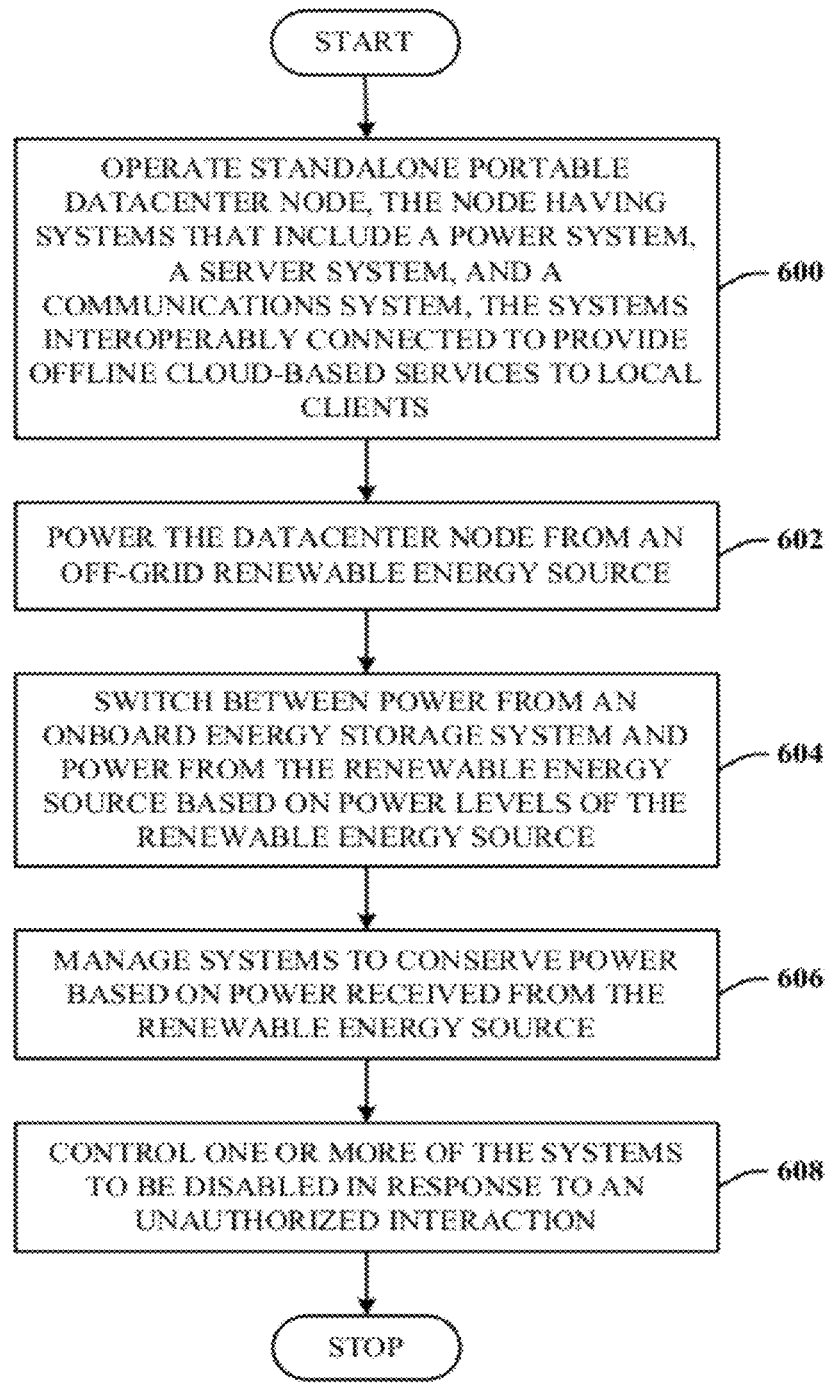
FIG. 6 illustrates one potential computer-implemented cloud computing fabric method in accordance with the disclosed architecture.

FIG. 6 illustrates a computer-implemented cloud computing fabric method in accordance with the disclosed architecture. At 600, a standalone portable datacenter node is operated. The node includes systems that comprise a power system, a server system, and a communications system, the systems interoperably connected to provide offline cloud-based services to local clients. At 602, the datacenter node is powered from an off-grid renewable energy source. At 604, switching is performed between power from an onboard energy storage system and power from the renewable energy source based on power levels of the renewable energy source. At 606, the systems are managed to conserve power based on power received from the renewable energy source. At 608, one or more of the systems are controlled to be disabled in response to an unauthorized interaction.

Figure 7:
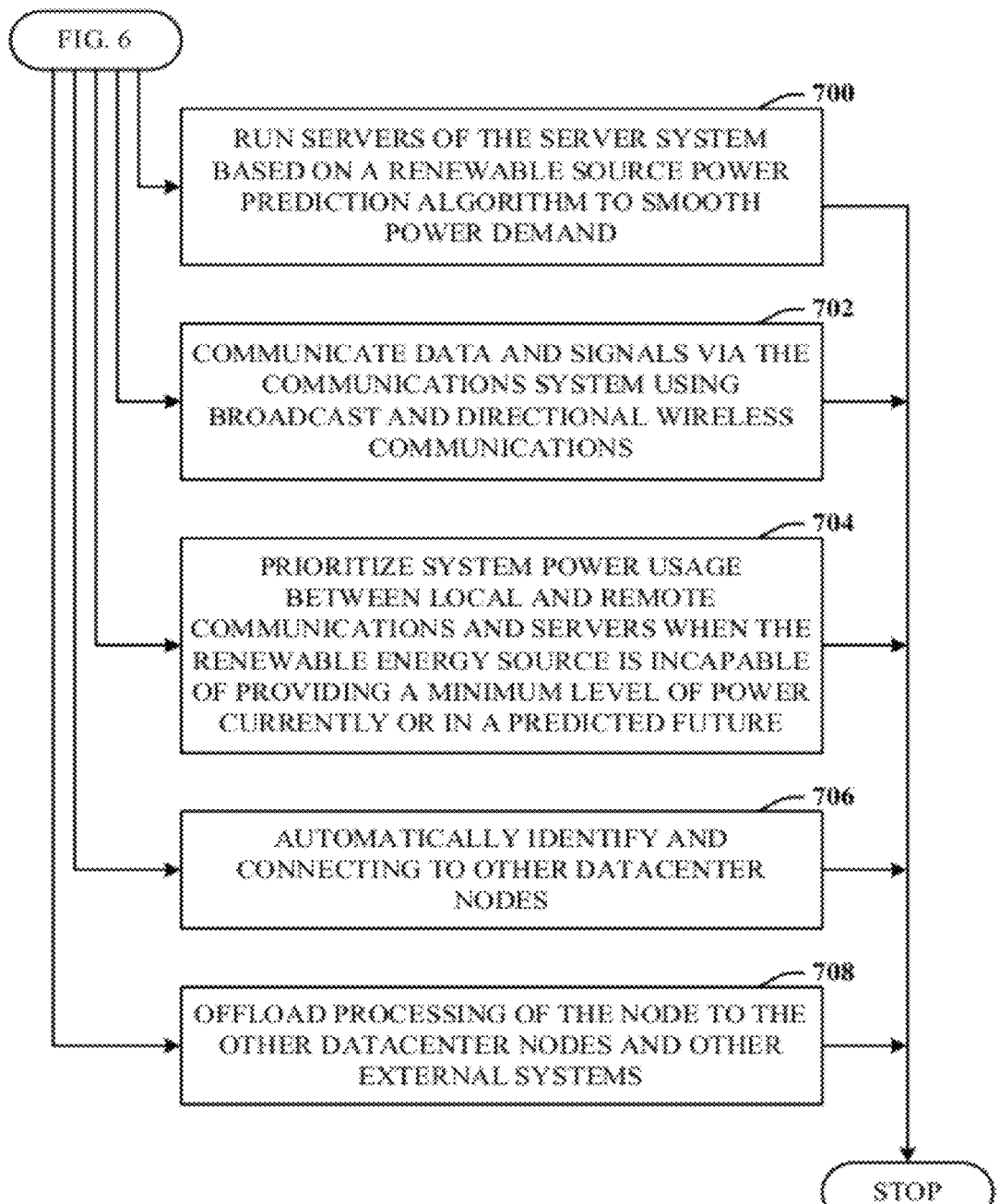
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, servers of the server system are run based on a renewable source (e.g., solar power, wind power, etc.) prediction algorithm to smooth power demand. At 702, data and signals are communicated via the communications system using broadcast and directional wireless communications. At 704, system power usage is prioritized between local and remote communications and servers when the renewable energy source is incapable of providing a minimum level of power currently or in a predicted (estimated) future. At 706, other datacenter nodes are automatically identified and connected to. At 708, processing of the node is offloaded to other datacenter nodes and other external systems.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
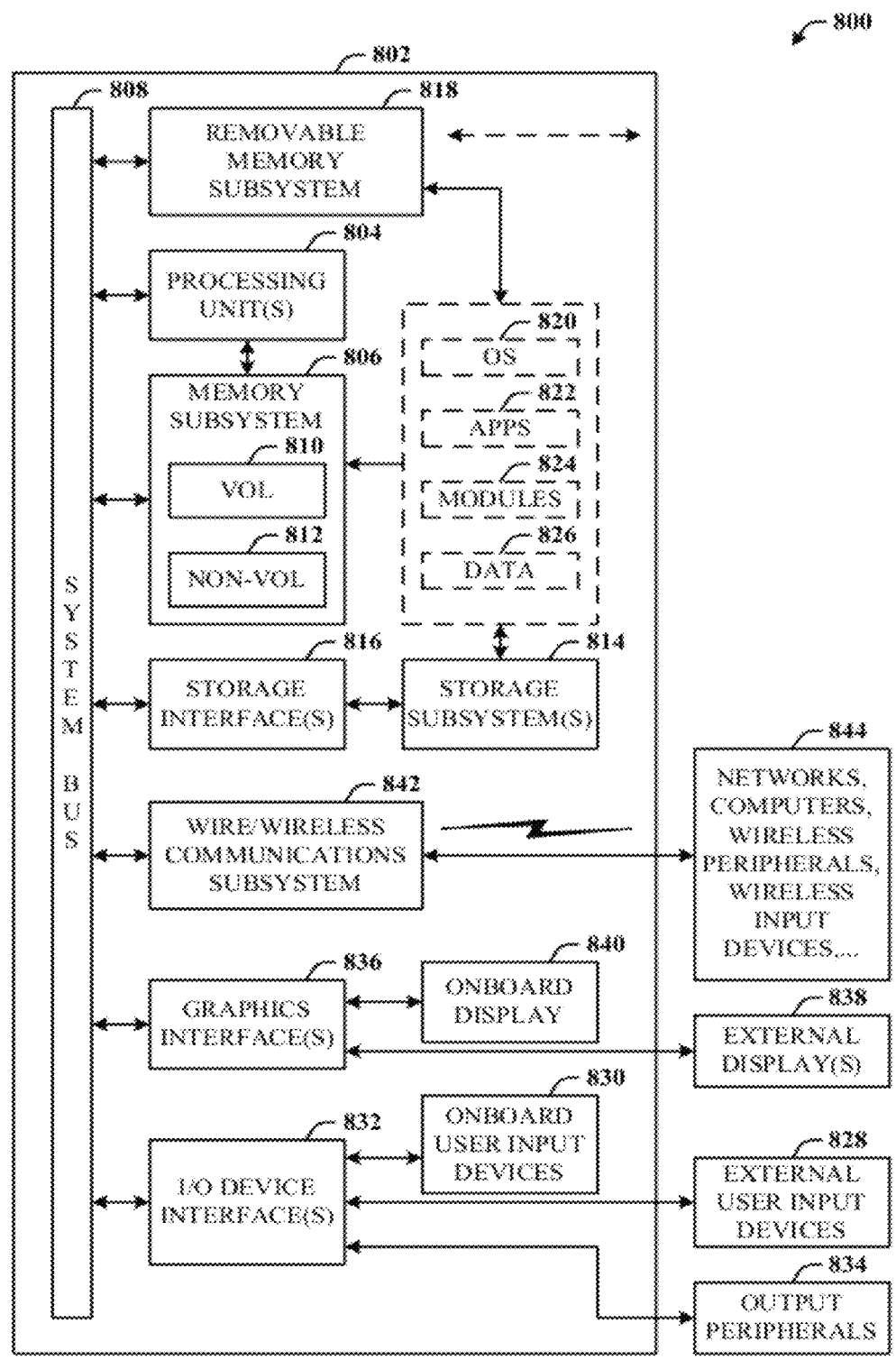
FIG. 8 illustrates a block diagram of a computing system that can interface and facilitate user configuration of the servers and other node systems in accordance with the disclosed architecture.

Referring now to FIG. 8, there is illustrated a block diagram of a computing system 800 that can interface and facilitate user configuration of the servers and other node systems in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), and/or solid state drive (SSD), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cloud computing fabric, comprising:
   multiple standalone portable datacenter nodes each configured to provide cloud computing services to a plurality of local clients, each datacenter node powered by one or more locally renewable energy sources and capable of operating independently of a global communications data packet network while providing the cloud computing services to the plurality of local clients; and
   a microprocessor that executes computer-executable instructions associated with at least one of the datacenter nodes.

2. The fabric of claim 1, wherein each datacenter node includes an energy storage system charged by the one or more locally renewable energy sources.

3. The fabric of claim 1, wherein each datacenter node includes a power tracking component configured to monitor input power of the one or more locally renewable energy sources and provides optimum available power to a power supply unit and an energy storage array.

4. The fabric of claim 1, wherein each datacenter node includes a secondary power supply component configured to obtain power from an energy storage bank when power is unavailable directly from at least one of the one or more locally renewable energy sources or a grid power system.

5. The fabric of claim 1, wherein each datacenter node includes servers that run based on load requests and available power.

6. The fabric of claim 5, wherein the servers run a power prediction algorithm that predicts power available to run one or more of the servers.

7. The fabric of claim 1, wherein each datacenter node includes a router component configured to provide directional and broadcast connectivity to other nodes and local clients.

8. The fabric of claim 1, wherein each datacenter node includes an operation management component configured to control computer load within a datacenter node and in coordination with load of servers of other datacenter nodes.

9. The fabric of claim 1, wherein each datacenter node includes a security component configured to disable functionality of a datacenter node in response to unauthorized movement of the datacenter node.

10. A cloud computing fabric, comprising:
a portable, standalone datacenter node configured to provide cloud computing services to a plurality of local clients, the datacenter node operates independently of a global communications data packet network while providing the cloud computing services to the plurality of local clients, the datacenter node comprises:
an off-grid power system configured to receive power from one or more locally renewable energy sources;
a server system configured to provide the services to the local clients on demand;
a power management component configured to manage onboard systems to power onboard systems off and on based on need; and
a router component configured to provide directional and broadcast connectivity with other datacenter nodes, the local clients, and optionally, the global communications data packet network; and
a microprocessor that executes computer-executable instructions associated with at least the datacenter node.

11. The fabric of claim 10, wherein the datacenter node includes an operations management component that controls processing load across servers of the server system within the datacenter node and in coordination with servers of other nodes of the cloud computing fabric.

12. The fabric of claim 11, wherein the operations management component offloads processing to local clients and other external systems.

13. The fabric of claim 10, wherein the datacenter node includes a geolocation component that identifies geographical location of the datacenter node.

14. The fabric of claim 10, wherein the datacenter node automatically detects other datacenter nodes and communicates with the other datacenter nodes of the fabric.

15. A computer-implemented cloud computing fabric method, comprising acts of:
operating a standalone portable datacenter node, the datacenter node having systems that include a power system, a server system, and a communications system, the systems interoperably connected to provide cloud-based services to local clients;
powering the datacenter node from an off-grid renewable energy source;
switching between power from an onboard energy storage system and power from the renewable energy source based on power levels of the renewable energy source;
managing the systems to conserve power based on power received from the renewable energy source; and
configuring at least one processor to perform the acts of operating, powering, switching, and managing.

16. The method of claim 15, further comprising running servers of the server system based on a renewable source power prediction algorithm to smooth power demand.

17. The method of claim 15, further comprising communicating data and signals via the communications system using broadcast and directional wireless communications.

18. The method of claim 15, further comprising prioritizing system power usage between local and remote communications and servers when the renewable energy source is incapable of providing a minimum level of power currently or in a predicted future.

19. The method of claim 15, further comprising automatically identifying and connecting to other datacenter nodes.

20. The method of claim 15, further comprising offloading processing of the datacenter node to other datacenter nodes and other external systems.

21. A cloud computing fabric, comprising:
a portable standalone datacenter node in the fabric of multiple portable standalone datacenter nodes, the standalone portable datacenter node comprising:
a power supply unit capable of receiving power from a renewable energy source and connected to an energy storage component, the power supply unit provides power to the portable standalone datacenter node;
a memory configured to store computer-executable instructions that enable the datacenter node; and
a processor configured to execute the computer-executable instructions the memory;
the portable standalone datacenter node configured to operate autonomously and provide cloud computing services to local clients whether the portable standalone datacenter node is connected to or disconnected from a feeder network.

22. The fabric of claim 21, wherein the datacenter node operates autonomously in an off-grid fashion, both power-wise and Internet connection-wise, and employs computational operations that can be assisted using idle processor cycles of one or more of the local clients.

23. The fabric of claim 21, wherein the datacenter node communicates at least one of wired or wirelessly with other datacenter nodes and the local clients using medium range or point-to-multipoint access links.

24. The fabric of claim 21, wherein the datacenter node comprises a prediction algorithm configured to predict power availability based on weather forecast information as a smart energy saving mechanism.

25. The fabric of claim 21, wherein the datacenter node is configured to adapt realtime power consumption based on the current environmental conditions, energy available in onboard energy storage systems, and expected computational workload assigned or soon to be assigned.

26. The fabric of claim 21, wherein the datacenter node is configured to decrease excessive communications with peer datacenter nodes.

27. The fabric of claim 21, wherein the datacenter node is configured to cease connectivity to the feeder network.

28. The fabric of claim 21, wherein the datacenter node is configured to take a full snapshot of its state, store the state locally, and transit to a sleep mode to conserve power.

29. The fabric of claim 21, wherein when the datacenter node boots, the datacenter node detects variables that comprise local environment of the datacenter node, geographical location of the datacenter node, and other datacenter nodes, and optimizes behavior of the datacenter node based on these variables.

30. The fabric of claim 21, wherein the datacenter node comprises a plurality of servers that utilize shared storage.

31. The fabric of claim 21, wherein the datacenter node communicates with another datacenter node using at least one of a multi-hop technology or a multi-path technology.

32. The fabric of claim 21, wherein the datacenter node builds a routing table that comprises global knowledge of network topology of multiple datacenter nodes, or builds the routing table only when needed to send a packet to a destination.

33. The fabric of claim 21, wherein the datacenter node accesses network resources of the feeder network in a cached manner.

\* \* \* \* \*